United States Patent [19]

Johnston et al.

[11] 4,302,745
[45] Nov. 24, 1981

[54] AIRCRAFT LOAD FACTOR OVERLOAD WARNING SYSTEM

[75] Inventors: John T. Johnston, St. Charles; George W. Venorsky, Florissant, both of Mo.

[73] Assignee: The United States of America as represented by the Secretary of the Air Force, Washington, D.C.

[21] Appl. No.: 110,957

[22] Filed: Jan. 10, 1980

[51] Int. Cl.³ .............................................. G08B 21/00
[52] U.S. Cl. ........................... 340/27 AT; 73/178 H; 244/17.13; 244/194; 340/27 R; 340/665
[58] Field of Search .......... 340/27 R, 27 AT, 27 NA, 340/27 SS, 665, 666, 669, 670; 364/424, 426, 434, 442, 512, 508, 566, 567, 463; 244/194, 195, 17.13, 178, 179; 73/178 R, 178 T, 178 H; 318/585

[56] References Cited

U.S. PATENT DOCUMENTS

| | | |
|---|---|---|
| 2,682,768 | 7/1954 | White ................................ 340/27 R |
| 3,051,416 | 8/1962 | Rotier . |
| 3,077,575 | 2/1963 | Beck et al. ......................... 340/27 R |
| 3,103,328 | 9/1963 | Rafferty . |
| 3,572,618 | 3/1971 | Willett . |
| 4,110,605 | 8/1978 | Miller ................................. 364/463 |
| 4,115,755 | 9/1978 | Cotton ................................ 364/426 |

Primary Examiner—James J. Groody
Attorney, Agent, or Firm—Donald J. Singer; Willard R. Matthews, Jr.

[57] ABSTRACT

An overload warning system for fighter type aircraft combines analytical techniques of computing structural loads with flight conditions and aircraft control inputs to calculate the allowable load factor/control input on a real time basis. The flight conditions and aircraft control inputs are monitored by a microprocessor, which continuously monitors actual load factor, compares the answers with a computed allowable value and generates an output signal whenever a prescribed value is exceeded. This signal is available for transmission to aural or visual warning devices and for permanent recording.

5 Claims, 1 Drawing Figure

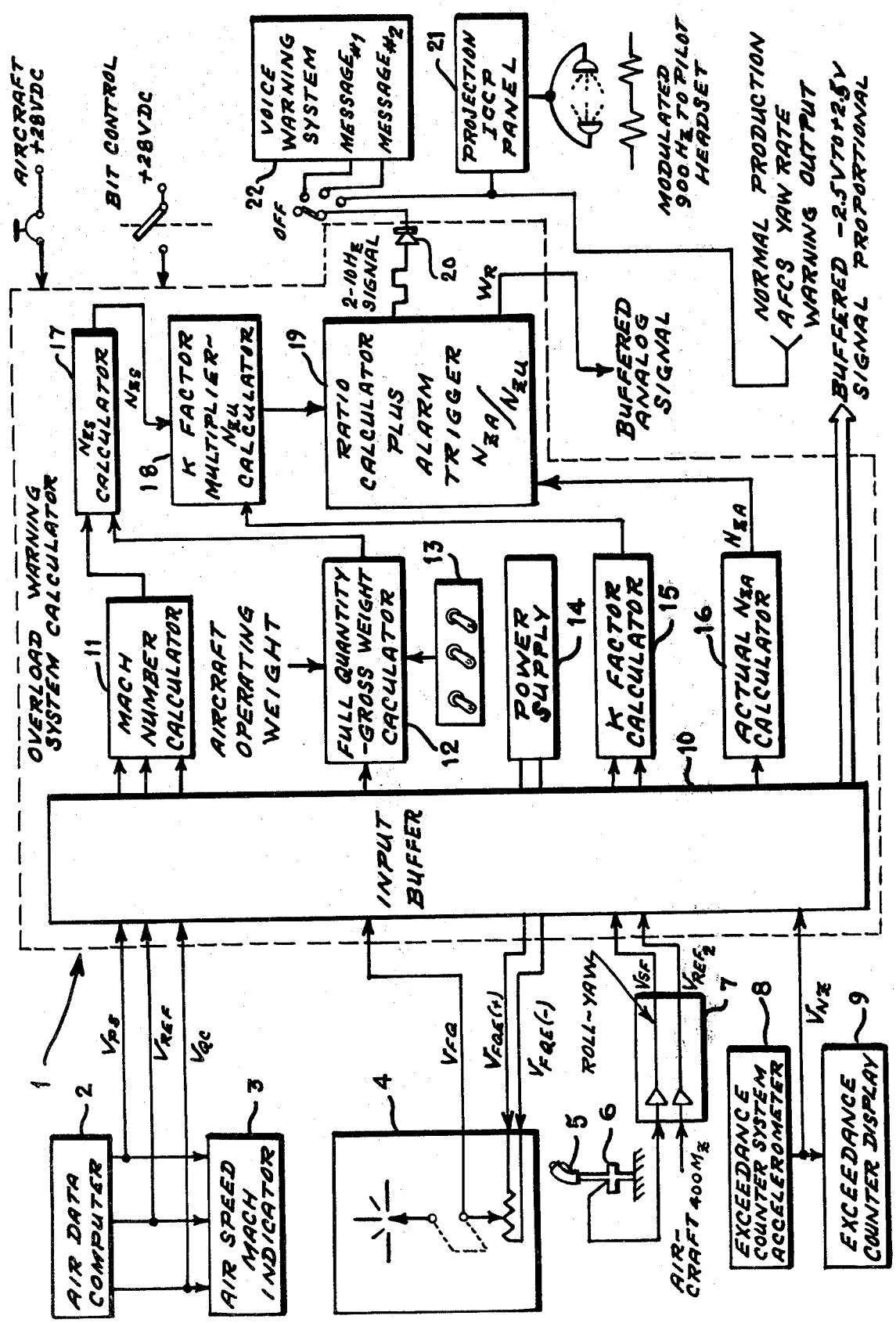

4,302,745

AIRCRAFT LOAD FACTOR OVERLOAD WARNING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to fighter aircraft and to means for preventing operational maneuvers thereof beyond prescribed load factor limits.

The latest fighter airplane can easily maneuver beyond the load factor limits defined in the flight manuals in the majority of the flight envelope. The current method used to preclude overloading the airframe is to define load factor limits as a function of gross weight, one limit for symmetrical maneuvering and another for unsymmetrical maneuvers. Most pilots are not cognizant of the engineering definition of "unsymmetrical maneuvers" which establishes the load factor limit nor can it be expected of the pilot to constantly compute the load factor limit for an aircraft with varying weight. As a result the pilot must derive some kind of conservative technique to determine the maximum load factor to attempt to stay within. In the case of the F-15 this has not been successful resulting in many inspection hours required from over "g" ing the aircraft.

There have been numerous incidents of pilots exceeding the published handbook (F-15 Flight Manual TO IF-15-1) acceleration limits on operational aircraft. This is compounded by the inaccuracy of the cockpit G meter reading when performing accelerated maneuvers and the wide range of gross weight capability of the F-15 aircraft. This situation is even further complicated by maneuver asymmetry, configuration variation limits, and the fact that the aircraft capabilities far exceed the structural design requirements. An intentional effort has been made to keep the F-15 operating limitations (published in the F-15 Flight Manual) as simple as possible. However, this approach tends toward unnecessarily restrictive limitations. The present invention overcomes the foregoing problem and limitations by continuously monitoring the significant parameters which contribute to loading the airframe structure, computing the allowable maneuvering load factor and/or lateral stick force and transmitting aural warning to the pilot of an approaching overloading condition. The aircraft capability in this way can be more fully utilized and overloading conditions are avoided.

SUMMARY OF THE INVENTION

The overload warning system of the invention utilizes various aircraft data sources and computer means to calculate on a real time basis the ratio of actual to allowable aircraft load factors and generates a warning signal when the ratio exceeds a given limit. Aircraft gross weight (calculated from fuel quantity, aircraft operating weight and aircraft stores weight) together with a mach number (derived from air speed and static pressure data) are used to determine an allowable symmetrical load factor. The symmetrical load factor is multiplied by a K fctor that is a function of aircraft control stick displacement to provide the allowable load factor. A computer divides the actual load factor (derived from the aircraft exceedance counter system accelerometer) by the allowable load factor and compares it with a fixed ratio value. A warning signal is generated if the fixed ratio value is exceeded. The warning signal can be applied to visual, aural or recording devices.

It is a principal object of the invention to provide a new and improved aircraft load factor overload warning system.

It is another object of the invention is provide an aircraft overload warning system that will effectively prevent maneuvers beyond the load factor limits defined by the aircraft flight manual.

It is another object of the invention to provide an aircraft overload warning system that operates in real time.

It is another object of the invention to provide an aircraft overload warning system that does not require constant pilot computation of load factor limits for an aircraft with varying weight.

It is another object of the invention to provide an aircraft overload warning system that does not depend upon the accuracy of the aircraft cockpit G meter.

It is another object of the invention to provide an aircraft overload warning system that effectively operates regardless of aircraft maneuver assymetry.

These together with other objects, features and advantages of the invention will become more readily apparent from the following detailed description when taken in conjunction with the accompanying drawing.

DESCRIPTION OF THE DRAWING

The sole FIGURE of the drawing is a functional block diagram of the overload warning system of the invention.

DETAILED DESCRIPTION OF THE PREFERRED EMBODIMENT

The Overload Warning System comprehended by the invention is designed to produce a warning to the pilot when aircraft load factor (Nz @ c.g.) in a symmetrical maneuver approaches the maximum allowable or when the addition of unsymmetrical loading, due to lateral control stick inputs, in combination with a load factor would cause exceedance of maximum allowable limits. Load factor build up rates allow symmetrical load warning directly from detection of Normal Acceleration (Nz). The onset rate of unsymmetrical loading, due to roll rate, requires a predictive capability. Roll rate and lateral stick force are approximately linearly related parameters with rate build-up lagging the control input by a time delay sufficient for warning purposes, thus providing the predictive function.

The Overload Warning System calculates allowable symmetrical load factor using:

(a) aircraft gross weight derived from the production fuel quantity system and incremented by external stores data; and (b) a Mach number derived from the production Air Data Computer.

The allowable symmetrical load factor is then decremented by an amount proportional to lateral stick position to produce the total allowable load factor.

This is compared to the actual aircraft load factor obtained from the aircraft production Exceedance Counter System. Within some tolerance limits, exceedance of allowable load factor then produces several output functions. One is a modulated, warning signal. This signal can be routed to the aircraft yaw rate warning tone generator or to a Voice Warning System. By way of example, modulation frequency can be 2 Hz at a pre-set threshold value and then increase to 10 Hz at the allowable load limit. For normal, (non-exceedance) flight conditions, no warning signal is generated. Another output, an analog output proportional to the ratio of actual load factor to total allowable load factor, can be provided for system performance evaluations, flight control applications and aircraft data recording.

The FIGURE is a functional block diagram of the overload warning system of the invention. It operates from various inputs provided by standard aircraft systems. The following description references the Air Force TF-15 fighter plane by way of example. However, the same or similar data inputs are available on all aircraft of that type and the principles of the invention apply universally. Referring now to the FIGURE aircraft operational data are provided from production air data computer 2, production air speed mach indicator 3, production fuel quantity indicator 4, lateral stick force indicator 6 operating on control stick 5, roll-yaw computer 7, exceedance counter system accelerometer 8, power supply 14 and exceedance counter display 9. The overload warning system is implemented by overload warning system calculator 1 which includes input buffer 10, mach number calculator 11, fuel quantity gross weight calculator 12, external stores data programming switches 13, actual load factor $N_{ZA}$ calculator 16, allowable symmetrical load factor $N_{ZS}$ calculator 17, K factor multiplier 18, ratio calculator and alarm trigger 19 and diode 20.

In operation, the Mach number is derived from two analog outputs of the Air Data Computer 2 which are normally routed to the aft cockpit Airspeed-Mach Indicator (AMI) in TF-15 aircraft. They are the airspeed output and the static pressure output. The aft cockpit airspeed-mach meter can be operational at the same time as these signals are used to determining Mach discrete. It is necessary to derive the Mach Number from the outputs of air data computer 2. Specifically, the overload warning system must detect Mach number=0.92. The system will utilize different algorithms depending on whether the Mach number is above or below 0.92. These algorithms are defined below. The Mach 0.92 point is determined from the following relationship that exists between the $V_I$/ln Qc and ln Ps outputs at Mach 0.92.

$$V_{PS} - V_{PQ} = 1.655 \; VDC \; @ \; Mach \; 0.92$$

To establish a hysterisis band for OWS calculation purposes, the following $V_{Ps} - V_{Qc}$ relationship will also be required $$V_{Ps} - V_{Qc} = 1.686 \; VDC \; for \; Mach = 0.91$$

It is necessary to determine if the aircraft Mach number is below or above 0.92. For increasing Mach, the system computer uses $$V_{Ps} - V_{Qc} = 1.655 \; VDC \; \begin{matrix} -0 \\ +.01 \end{matrix} \; VDC$$

as the Mach 0.92 level.
For decreasing Mach, the computer uses $$V_{Ps} - V_{Qc} = 1.686 \; VDC \; \begin{matrix} -.01 \\ +0 \end{matrix} \; VDC$$

as the Mach 0.92 level. This establishes a hysterisis band to avoid erratic outputs at the Mach 0.92 point. Provisions can be included for adjustment of end points and magnitude of this hysterisis band.

The lateral Stick Force is a buffered, 400 Hz output from a bridge network. The amplitude of the signal is proportional to stick force and phasing with respect to a reference signal determined by direction of stick force, left or right. Both signal and reference are derived from aircraft 400 Hz power via transformer coupling.

Fuel quantity is obtained from the potentiometer circuit on the production fuel quantity indicator 4.

Calculation of aircraft gross weight is accomplished in several steps to produce
$GW_a = O.W. + W_{FUEL} + W_{STORES}$ where O.W. = F-15, #4 Operating Weight = 28.500 lb.
$W_{FUEL}$ = Weight of on-board fuel
$W_{STORES}$ = Weight of missiles, mille pylons, and CL fuel tank.

The aircraft external stores configuration is available from programming switches 13. These are programmed for each flight.

The calculation of allowable symmetrical load $N_{Zs}$ uses results of two previous calculations.

If Mach ≤ 0.92

$$Nz_s = \frac{336,000}{G.W._A} \left( \text{Truncated to a maximum of } *9.0 \; \begin{matrix} +0.0 \\ -0.01 \end{matrix} \; g \right)$$

If Mach > 0.92

$$Nz_s = \frac{274,000}{G.W._A} \left( \text{Truncated to a maximum of } *7.33 \; \begin{matrix} +0.00 \\ -0.01 \end{matrix} \; g \right)$$

The calculation of stick force (Fs) is mechanized by $$FS = |V_{S.F.}/C_2|$$

where: $V_{S.F.}$ is the output of the stick force sensor 6, $C_2$ is the nominal stick force sensor gradient $$\frac{0.275 \; VRMS}{Pound \; Force}.$$

The above can be corrected for power supply variations if necessary using the 7 VRMS reference signal ($V_{Ref}$). The range of interest for $F_S$ is ±17.5 pounds.

Calculation of lateral stick position (Ps) is accomplished as follows; actual lateral stick deflections are mechanically limited to 4 inches left and 4 inches right. The nominal output for ±4 inches of travel is ±17.0 pounds, however, resulting in an "effective" stick deflection ±4.12 inches. This shall be the range of interest for Ps.

$$Ps = C_3 \; (F_s)$$
$$where \; C_3 = \frac{4}{17} = \frac{.235 \; inch}{pound \; force}$$

The addition of lateral stick inputs during a symmetrical maneuver, causes the maneuver to become unsymmetrical. The allowable load factor (Nz) must be reduced during unsymmetrical maneuvers. This is accomplished by multiplying by a linear K factor which has a range of values from 1.0 to 0.8. The K factor is calculated as follows:

$$K = 1 - |(0.2/4.12)P_s|$$

Unsymmetrical allowable load factor $NZ_u$ is the allowable Nz when the contributions of lateral stick inputs are included. The $Nz_u$ of course, reduces to $Nz_s$ with no lateral stick inputs, (K=1.01).

$$Nz_u = Nz_s(K)$$

Actual lod factor $Nz_A$ is measured using the output of the Exceedance System Accelerometer 8.

$$Nz_A = [(C_4(V_{Nz}))] + 1$$

where $C_4 = 16 \text{ g}/12 \text{ volt} = 1.333 \text{ g/volt}$ and $V_{nz}$ is the accelerometer output voltage. The range of interest is 0 g to +9.0 g or $V_{nz}$ of −0.75 volts to +6.0 volts.

In order to produce a usable warning, the system must calculate the ratio of actual Nz ($Nz_A$) to maximum allowable Nz ($Nz_u$). This ratio is defined as $W_R$.

$$W_R = Nz_A/Nz_u$$

The output warning system provides the following at the output connector:

(a) Warning output to be routed to the production Integrated Communications Control Panel 21 (ICCP), or to the Voice Warning System 22;

(b) Buffered, −6.5 to +6.5 volt, analog output, proportional to $W_R$, to be routed to the Signal Data Recorder; and (c) Buffered, −2.5 to +2.5 volt, analog outputs for IDS recording/maintenance purposes. These signals are proportional to:
$W_R$
Warning Output
Stick Force
Stick Force Reference
Nz
Nz Reference (Internal)
Mach Number
Mach Number Reference
Fuel Quantity
Fuel Quantity Reference The warning output to panel 21 is a 50% duty cycle square wave with $V_{min} = 0$ VDC and $V_{max} = +28$ VDC. The warning system signal is paralleled with the production AFCS yaw rate warning input to the ICCP which modulates a 900 Hz tone generator in the ICCP with +28VDC being tone "ON" and 0 VDC being tone "OFF".

The system warning threshold is adjustable over a $W_R$ ratio range of 0.5 to 0.95. The warning tone pulse rate at threshold shall be 2 Hz at $W_R = 1.0$. The warning signal output at initial turn on ($t_o$) shall be the tone "ON" (+28VDC) level.

While the invention has been described in one presently preferred embodiment it is understood that the words which have been used are words of description rather than words of limitation and that changes within the purview of the appended claims may be made without departing from the scope and spirit of the invention in its broader aspects.

What is claimed is:

1. In an aircraft having a control stick for controlling aircraft roll rate, an air data computer outputting air speed and static pressure data, fuel quantity measuring means and an exceedance counter system accelerometer the improvement residing in an overload, warning system, said overload warning system comprising, means for sensing control stick lateral force, means for continuously monitoring the actual aircraft load factor from the aircraft exceedance counter system accelerometer, means for continuously computing an allowable aircraft load factor said allowable aircraft load factor being comprised of a symmetrical aircraft load factor derived from aircraft operating weight and stores data, the output of said fuel measuring means, and data from said air data computer, and a predictive unsymmetrical aircraft load factor derived from the output of said means for sensing control stick lateral force, means for continuously calculating the ratio of current actual load factor to current allowable load factor, and means for generating a warning signal when said ratio exceeds a given value.

2. The overload warning system defined in claim 1 wherein said means for continuously computing allowable aircraft load factor comprises means for calculating allowable symmetrical aircraft load factor, means for generating a K factor responsive to control stick lateral force, and means for multiplying said K factor and said allowable symmetrical aircraft load factor.

3. The overload warning system defined in claim 2 wherein said means for generating a K factor comprises calculating means receiving the output of said means for sensing control stick lateral force and calculating stick position data in response thereto, and multiplier means for multiplying said stick position data by a given constant, and said means for calculating allowable symmetrical aircraft load factor comprises a mach number calculator receiving aircraft speed and static pressure data and calculating a mach number therefrom, an aircraft gross weight calculator receiving fuel quantity data, aircraft operating weight and aircraft stores weight data and computing aircraft gross weight therefrom and calculator means for calculating allowable symmetrical aircraft load factor from the outputs of said mach number calculator and said aircraft gross weight calculator.

4. The overload warning system defined in claim 3 including means connecting said warning signal to an aural warning device.

5. The overload warning system defined in claim 4 including means connecting said warning signal to a visual warning device.

* * * * *